A. H. MITTAG.
FREQUENCY CHANGER.
APPLICATION FILED APR. 29, 1920.

1,423,959. Patented July 25, 1922.

Inventor:
Albert H. Mittag,
by *Albert G. Davis*
His Attorney.

UNITED STATES PATENT OFFICE.

ALBERT H. MITTAG, OF SCHENECTADY, NEW YORK, ASSIGNOR TO GENERAL ELECTRIC COMPANY, A CORPORATION OF NEW YORK.

FREQUENCY CHANGER.

1,423,959. Specification of Letters Patent. Patented July 25, 1922.

Application filed April 29, 1920. Serial No. 377,695.

*To all whom it may concern:*

Be it known that I, ALBERT H. MITTAG, a citizen of the United States, residing at Schenectady, in the county of Schenectady, State of New York, have invented certain new and useful Improvements in Frequency Changers, of which the following is a specification.

This invention relates to frequency changers and more particularly to the type in which rotation is effected by dynamo electric action.

One of the objects of my invention is to produce a frequency changer constructed of conventional induction motor parts. Another object is to eliminate expensive parts, such as commutators. With my invention it is possible to use a pair of single phase induction motors for increasing the frequency in the ratio of about 2 to 1. The device is extremely simple and reliable and inexpensive to manufacture.

In general, my invention comprises the use of two alternating fields produced by primary windings, having a phase displacement, each cooperating with its secondary, preferably a wound rotor, both of the rotors being so arranged with respect to the alternating fields that these fields produce a motor torque in one direction of rotation and generate an electromotive force due to the cutting of the lines of force produced by the alternating field, by the conductors on the rotor. This action may be explained on the familiar basis of resolving an alternating field into two components comprising oppositely rotating magnetic fields of equal amplitudes. The fields rotating in one direction serve to produce physical rotation as in an ordinary induction motor, while the fields rotating in the opposite direction cause an electromotive force of a higher frequency to be produced in the conductors of the rotor due to the relative movement thereof and the last mentioned rotating fields.

Figure 1:
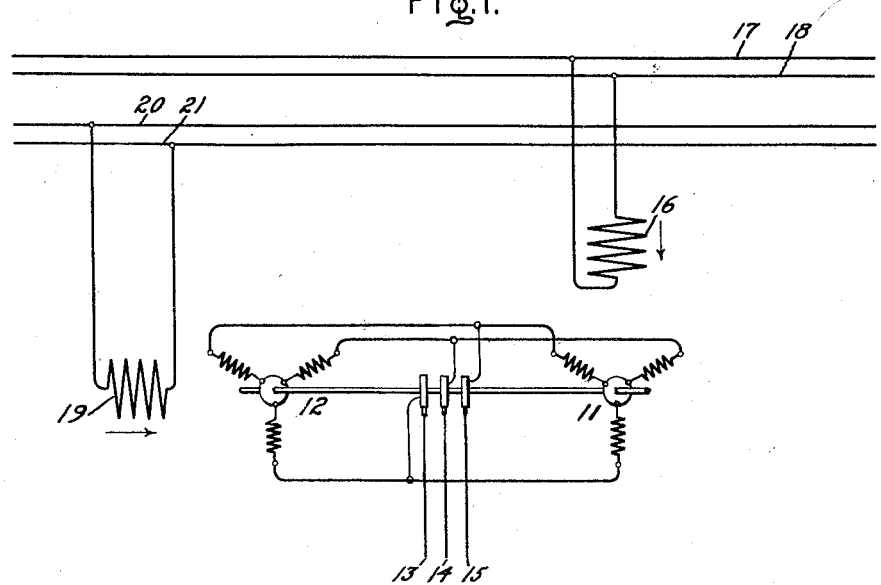
Figure 2:
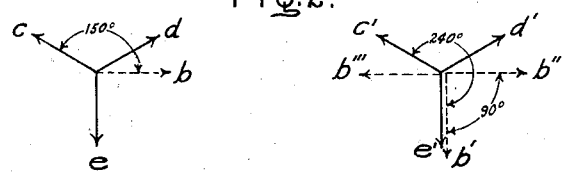

The construction and mode of operation of my invention may be understood from the description taken in connection with the accompanying drawing, in which Fig. 1 is a diagram showing the connections of the frequency changer when supplied from a two-phase source; and Fig. 2 comprises two vector diagrams showing the equivalent space relation of the rotor conductors in the rotating fields produced by the exciting coils.

Referring now more in detail to the drawing, in which like reference characters refer to like parts throughout, the frequency changer in this instance is shown as made up of a pair of wound rotors 11 and 12, each connected in Y so as to form a three-phase arrangement and rigidly fastened together mechanically so as to preclude relative motion. This may most expeditiously be done by fastening both rotors 11 and 12 on a common shaft. The rotor windings are connected electrically in parallel, and taps 13, 14 and 15 are used for taking off a current of higher frequency than is supplied to the stators of the induction motor elements. How this higher frequency is produced by the apparatus will be shown later. The rotor 11 cooperates with the single phase field produced by winding 16 supplied from mains 17 and 18 connected to a source of alternating current. The rotor 12 cooperates with the single-phase field produced by winding 19 connected to mains 20 and 21 supplied with alternating current from a source dephased from that supplying current to the winding 16. It is to be understood that any means may be utilized in case single-phase power alone is available to dephase the currents flowing in the windings 16 and 19. In the present instance the diagrams are drawn for a case where a quarter-phase system of supply is available; that is, one in which the electromotive force applied to winding 16 is leading the electromotive force supplied to winding 19 by 90°. The relative phase position between the axis of the lagging field produced by winding 19 and its cooperating rotor 12 differs by an angle of 90° from the relative phase position between the axis of the leading field produced by winding 16 and its cooperating rotor 11, as is readily seen from inspection of Fig. 1. The relative phase position between the fields and the rotors depends upon how much the two alternating fields are dephased. If the alternating field produced by winding 16 be dephased by an angle $a$ from the alternating field produced by winding 19, then the relative phase position of the axis of the field produced by winding 16 and rotor 11 should differ by the same angle $a$ from the relative phase position of the axis of the field produced by winding 19 and its rotor 12.

The operation of the system may be better understood by reference to Fig. 2, which shows the relative effective positions of the rotor conductors and the component rotating fields produced by the windings 16 and 19. Each of the alternating fields may be resolved into a counter clockwise rotating field and a clockwise rotating field. Let us consider first of all the counter clockwise fields and what effect they have upon the conductors in rotors 11 and 12 while these rotors are stationary. The counter clockwise component of the field produced by winding 19 is assumed in the left hand diagram of Fig. 2, to have a direction coincident with the axis of its winding at the start, and this condition is shown by the arrow marked $b$. The E. M. F.'s generated in the three phases $c$, $d$ and $e$ each have a phase relation to this direction of the field $b$ dependent upon their relative angular position. Thus the E. M. F. induced in phase $c$, as the field rotates is equal to $\frac{d\phi}{-dt}$; but $\phi$ in this case is proportional to the cosine of the angle between the direction of the rotating field shown by arrow $b$ and the position of the conductors in phase $c$. This angle at any instant, is $(wt-150°)$, where $w$ is the angular velocity of the rotating field. This may be seen to be true because the rotating flux denoted by the arrow $b$ must travel through 150° before it is in line with phase $c$. Of course this theory is based upon standstill conditions of the rotor. The corresponding phases on rotor 11 are designated by the characters $c'$, $d'$ and $e'$. The flux acting on the conductors comprising phase $c'$ at any instant after the start is proportional to $\cos[wt-(240°-90°)]$. This is true since the field produced by the winding 16 is 90° ahead of that produced by the winding 19. Thus the axis of this field at the start is indicated by arrow $b''$, 90° ahead of arrow $b'$, which is parallel with the axis of winding 16. This investigation shows that for the arrangement indicated and for the counter clockwise rotating components, the E. M. F.'s generated in phases $c$ and $c'$ are in phase. Exactly the same reasoning applies for the E. M. F.'s generated in the pairs of phases $d$, $d'$ and $e$, $e'$.

Now let us consider the E. M. F.'s induced in these phases due to the rotation of the clockwise components of the alternating fields. In this case the flux acting to generate an E. M. F. in phase $c$ is proportional to $\cos(wt+150°)$. In the same way the E. M. F. induced in phase $c'$ due to the clockwise rotating field is proportional to $\cos(wt+240°+90°)$, since the field produced by the winding 16 is 90° ahead in phase of that produced by winding 19, and is therefore, at the start 90° ahead of arrow $b'$, as is shown by the arrow $b'''$. By comparing these two values it is seen that the E. M. F. induced in the pair of phases $c$ and $c'$ are 180° out of phase so that a heavy circulating current can flow through the connection between these two phases. A similar reasoning will show that E. M. F.'s 180° displaced are induced in the pairs of phases $d$, $d'$, and $e$, $e'$. These heavy circulating currents produce a motor torque and cause rotation of the rotor members just as in an ordinary polyphase induction motor. This rotation will be in a clockwise direction in the case illustrated. As the induction motor rotors come up to speed, the frequency of the voltage induced by the fields rotating clockwise decreases in relation to the frequency supplied to the windings 16 and 19 to almost zero, and in fact, equals the slip frequency. Thus if $s$ is the slip in per cent of the induction motor elements, and the frequency of the source of supply is denoted by $f$, then the frequency of this voltage is $fs$. On the other hand, the frequency of the voltage induced by the fields rotating counter clockwise increases from $f$ to $f+f(1-s)$, or $2f-fs$. This is the frequency of the E. M. F. taken from the rotors by means of the taps 13, 14, and 15. If the leads connecting the two secondaries are sufficiently large, the resistance is negligible and the slip $s$ will be very small, so that the frequency of the power that can be taken from the secondaries will be almost $2f$.

In case polyphase power be not available, a dephased alternating field may be produced by any well-known phase-splitting means, and the relative physical arrangement varied, dependent upon the lag between the fields produced by the windings 16 and 19. Thus if the flux produced by winding 19 lags by an angle $a$ behind the flux produced by the winding 16, then the axis of this winding 19 will be displaced an amount equal to an angle $a$ instead of 90° as shown in the drawing. For this condition it may readily be proved as before that E. M. F.'s are produced in the pairs of phases due to either the clockwise or the counter clockwise rotating components that are in phase with each other and are therefore capable of supplying an external load, while the E. M. F.'s produced due to the other component are dephased by a relatively large angle which serves to produce rotation of the rotors in the same way as has been described. Whether the angular displacement be to the right or left is immaterial, since such a variation merely reverses the direction of rotation of the machine.

While I have shown in the accompanying drawings, the preferred embodiment of my invention, it is not limited thereto, and I aim in the appended claims to embrace all modifications falling fairly within the scope of my invention.

What I claim as new and desire to secure by Letters Patent of the United States, is:

1. In a dynamo electric machine, in combination, means for producing a pair of alternating magnetic fields differing in phase by an angle $a$, a pair of similarly wound mechanically connected rotors cooperating with said fields, each phase on one of said rotors being electrically connected to the corresponding phase on the other of said rotors, said two rotors being so arranged with respect to the axes of their respective fields that the relative phase position between the axis of the lagging field and its cooperating rotor differs by an angle $a$ from the relative phase position between the axis of the leading field and its cooperating rotor, and taps from the connections of said rotors for supplying an external load.

2. In a frequency changer, in combination, a pair of single phase induction motor elements comprising a pair of parallel connected secondary members, primary members cooperating therewith, said secondary members being relatively movable as a unit with respect to the primary members, means for supplying said primary members with dephased currents and taps from the connections of said secondary members for supplying an external load.

3. In a frequency changer, in combination, a pair of single phase induction motor elements comprising two similarly wound secondary members mechanically and electrically connected, two primary windings for the secondary members, means for supplying said primary windings with currents dephased by an angle $a$, said primaries and secondaries being so arranged mechanically that the relative phase position between the axis of the primary supplied with the lagging current and its cooperating secondary member differs by an angle $a$ from the relative phase position between the axis of the primary supplied with the leading current and its cooperating secondary member, and taps from the connections of said secondary members for supplying an external load.

4. In a frequency changer, in combination, a pair of induction motor elements, the secondaries of which are connected in parallel, and means for exciting the primaries of said elements in such a way that a motor torque is produced in one direction, due to circulating currents between said secondaries, and E. M. F.'s generated in said secondaries substantially in phase with each other, and taps from the connections of said secondaries for supplying an external load at a frequency higher than the source of supply when the machine is allowed to rotate.

5. In a frequency changer, means for producing a pair of oppositely rotating magnetic fields, means for producing another pair of oppositely rotating magnetic fields dephased respectively from the first pair, means comprising two wound rotors mechanically connected for utilizing those two fields having the same direction of rotation to produce mechanical rotation of these rotors in that direction, and for utilizing the other two fields having the opposite direction of rotation for generating an E. M. F. to supply an external load, due to the relative motion of the rotors and said other two fields, said E. M. F. thus having a frequency higher than the source of supply by an amount proportional to the speed of rotation of the wound rotors.

6. In a frequency changer, in combination a pair of polyphase wound rotors connected in parallel for supplying an external load at a relatively high frequency, and means adapted to be connected to a source of relatively low frequency for producing oppositely rotating fields, said means cooperating with the rotors to produce motor currents therein in response to the field rotating in one direction, and to generate E. M. F.'s in the rotor windings in response to the relative motion thereof and the field rotating in the opposite direction.

7. In a frequency changer, in combination a pair of induction motor elements the secondaries of which are connected in parallel and mechanically connected to rotate together, means for respectively exciting the primaries of said elements by dephased alternating currents having a frequency $f$ whereby said secondaries are caused to rotate at slip $s$ and generated an alternating current having a frequency equal to $2f-fs$, and taps from the connections of said secondaries for supplying an external load.

In witness whereof, I have hereunto set my hand this 28th day of April, 1920.

ALBERT H. MITTAG.